(12) United States Patent
Liu et al.

(10) Patent No.: US 11,258,717 B2
(45) Date of Patent: Feb. 22, 2022

(54) METHOD FOR SENDING SERVICE PACKET, NETWORK DEVICE, AND SYSTEM

(71) Applicant: Huawei Technologies Co., Ltd., Shenzhen (CN)

(72) Inventors: Mengzhu Liu, Beijing (CN); Fengkai Li, Beijing (CN); Yinben Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/886,218

(22) Filed: May 28, 2020

(65) Prior Publication Data

US 2020/0296046 A1  Sep. 17, 2020

Related U.S. Application Data

(63) Continuation of application No. PCT/CN2018/117367, filed on Nov. 26, 2018.

(30) Foreign Application Priority Data

Nov. 28, 2017 (CN) .......................... 201711212836.8

(51) Int. Cl.
| | | |
|---|---|---|
| *H04L 12/851* | (2013.01) | |
| *H04L 1/18* | (2006.01) | |
| *H04L 29/06* | (2006.01) | |
| *H04L 47/2425* | (2022.01) | |
| *H04L 69/16* | (2022.01) | |

(52) U.S. Cl.
CPC ........ *H04L 47/2433* (2013.01); *H04L 1/1812* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 2010/0232427 A1 | 9/2010 | Matsushita et al. | |
| 2013/0080657 A1 | 3/2013 | Yamaguchi et al. | |
| 2014/0029620 A1* | 1/2014 | Zheng ..................... | H04L 47/27 370/392 |
| 2014/0355623 A1* | 12/2014 | Waclawsky ........... | H04L 69/163 370/465 |

(Continued)

FOREIGN PATENT DOCUMENTS

| | | |
|---|---|---|
| CN | 101369875 A | 2/2009 |
| CN | 101507202 A | 8/2009 |
| CN | 101674242 A | 3/2010 |

(Continued)

*Primary Examiner* — Robert M Morlan

(74) *Attorney, Agent, or Firm* — Conley Rose, P.C.

(57) ABSTRACT

A service packet sending method and device include receiving, by a first network device, a Transmission Control Protocol (TCP) packet from a second network device, where the TCP packet includes a service identifier, obtaining, by the first network device, based on the service identifier, a priority of a service, obtaining a TCP window based on the priority of the service, sending a TCP acknowledgement (ACK) packet including the TCP window to the second network device to enable the second network device to calculate a size of a service packet to be sent to the first network device.

21 Claims, 10 Drawing Sheets

(56) References Cited

U.S. PATENT DOCUMENTS

2016/0255009 A1 9/2016 Ramaiah et al.
2016/0373361 A1* 12/2016 Dhanabalan ............ H04L 47/24

FOREIGN PATENT DOCUMENTS

| CN | 1028935 A | 1/2013 |
| EP | 2048833 A1 | 4/2009 |
| EP | 2693707 A1 | 2/2014 |

* cited by examiner

METHOD FOR SENDING SERVICE PACKET, NETWORK DEVICE, AND SYSTEM

CROSS-REFERENCE TO RELATED APPLICATIONS

This application is a continuation of International Patent Application No. PCT/CN2018/117367 filed on Nov. 26, 2018, which claims priority to Chinese Patent Application No. 201711212836.8 filed on Nov. 28, 2017. The disclosures of the aforementioned applications are hereby incorporated by reference in their entireties.

TECHNICAL FIELD

The present disclosure relates to the communications field, and in particular, to a method for sending a service packet, a network device, and a system.

BACKGROUND

Transmission Control Protocol (TCP) is a connection-oriented and reliable transport layer communications protocol. In a scenario in which TCP is used to transmit a service packet, when a network device receives packets from a high-speed interface and sends packets to a low-speed interface, or when traffic of a plurality of user access devices converges on a same network device, the network device may lose service packets. Consequently, the requirement (for example, a throughput) of the service carried by the TCP cannot be met, user experience is seriously affected, and in particular, when the network device transmits a video service, the video service is interrupted, or the like.

In order to resolve such a problem, a buffer of a network device is usually added to avoid a packet loss. However, this manner increases a queuing time for service traffic in a buffer, and consequently, a transmission delay of the service traffic increases, and a service transmission requirement cannot be ensured. In addition, when there is burst traffic on a network device, the packet loss still occurs to some extent.

SUMMARY

This application provides a method for sending a service packet, a network device, and a system, to obtain a TCP window based on a priority of a service such that a size of a service packet sent by a transmit end can be flexibly controlled, and a loss of service packets is reduced while a service packet transmission requirement is met.

According to a first aspect, an embodiment of the present disclosure provides a method for sending a service packet. The method includes receiving, by a first network device, a TCP packet sent by a second network device, where the TCP packet includes a service identifier, determining, by the first network device based on the service identifier, a priority of a service corresponding to the service identifier, obtaining, by the first network device, a TCP window based on the priority of the service, and sending, by the first network device, a first TCP acknowledgement (ACK) packet to the second network device, where the first TCP ACK packet includes the TCP window, and the TCP window is used by the second network device to calculate a size of a service packet to be sent to the first network device.

In the foregoing method, the first network device obtains the priority of the service based on the service identifier in the TCP packet, and then obtains the TCP window based on the priority of the service. Because the TCP window obtained by the first network device is determined based on a service priority, different transmission requirements of services of different priorities can be met, and a size of a packet sent by a transmit end can be flexibly controlled. For example, for a low-priority service, the TCP window may be a smaller one, and for a high-priority service, the TCP window may be a larger one. In this way, requirements of different services can be met, network resources can be fully utilized, and a loss of service packets can be reduced.

In a possible design, the first network device sends the TCP packet to a third network device, the first network device receives a second TCP ACK packet sent by the third network device, and the first network device updates a TCP window in the second TCP ACK packet with the TCP window, and generates the first TCP ACK packet. In this design, as an intermediate device on a TCP service packet transmission path, the first network device actively intercepts a TCP packet, calculates a TCP window based on the priority of the service, and replaces the TCP window with a TCP window in the TCP ACK packet sent by a service packet receive end such that the size of the service packet sent by the transmit end can be flexibly controlled.

In a possible design, when the priority of the service is a first priority, the first network device obtains service requirement information of the service, and calculates the TCP window based on the service requirement information. A service corresponding to the first priority is a high-priority service. If the priority of the service is the first priority, it indicates that the service is a high-priority service.

In a possible design, when the first network device determines that the priority of the service is the first priority, the first network device sends the service identifier to a controller, and receives the TCP window that is calculated by the controller based on the service requirement information of the service.

In a possible design, the service requirement information includes a throughput, and the throughput is used to identify traffic of a corresponding service that needs to be transmitted by the first network device within a unit time. The first network device calculates a TCP window based on the throughput and an occupied buffer size in a buffer of the first network device.

In the foregoing manner, the first network device calculates the TCP window based on the service requirement information. In this way, a transmission requirement of a service can be accurately ensured. Different TCP windows are obtained through calculation for different services such that a size of a service packet sent by a transmit end can be flexibly controlled. When a bandwidth resource is given, bandwidth occupation of different services can be flexibly adjusted, thereby reducing a packet loss. In addition, when the first network device is an intermediate device on a TCP service packet transmission path, the TCP window is calculated based on an occupation status of the buffer of the first network device, thereby more accurately ensuring service transmission for the forwarded service.

In a possible design, the TCP window is calculated using the following formula:

$$\text{Throughput} * \frac{currentB}{C} \leq \text{window} < \text{Throughput} * \frac{B}{C},$$

where Throughput is a throughput included in the service requirement information, B is a size of the buffer of the first network device, including an occupied buffer size and an unoccupied buffer size, currentB is the occupied buffer size in the buffer of the first network device, when the first network device is the receive end of the service packet, C is a rate of reading a queue from the buffer by the first network device, or when the first network device is an intermediate device on a service packet transmission path, C is a transmission rate of an outbound interface used by the first network device to send the service packet, and window is the TCP window that needs to be calculated.

In the foregoing manner, the first network device can obtain a TCP window range through calculation using the foregoing formula. All TCP windows in the range can meet a throughput requirement of the service, and the TCP window can be flexibly adjusted. For example, when a buffer occupation rate of the first network device exceeds a specific threshold, for example, 80%, a TCP window may be selected to be a smaller value in the range obtained through calculation using the foregoing formula, or if the buffer occupation rate of the first network device is less than a specific threshold, for example, 40%, a TCP window may be selected to be a larger value in the range obtained through calculation using the foregoing formula. In this way, the buffer of the first network device is avoided from being excessively occupied while the TCP window can be flexibly adjusted to meet a user service requirement such that a loss of service packets is reduced.

In a possible design, the first network device calculates the TCP window using the following formula:

$$\text{Throughput} * \left(\frac{currentB}{C} + \Delta t\right) \leq \text{window} < \text{Throughput} * \left(\frac{B}{C} + \Delta t\right),$$

where Throughput is the throughput, B is the size of the buffer of the first network device, currentB is the occupied buffer size in the buffer of the first network device, when the first network device is the receive end of the service packet, C is a rate of reading a queue from the buffer by the first network device, or when the first network device is an intermediate device on a service packet transmission path, C is a transmission rate of an outbound interface used by the first network device to send the service packet, window is the TCP window that needs to be calculated, and when the first network device is the receive end of the service packet, $\Delta t$ is a processing delay of processing a service packet in the occupied buffer by the first network device, or when the first network device is an intermediate device on the service packet transmission path, $\Delta t$ is a transmission delay of an outbound interface used by the first network device to send a service packet.

In the foregoing manner, when calculating the TCP window, the first network device also uses the transmission delay of the outbound interface used by the first network device to send the service packet, or the processing delay of processing the service packet in the occupied buffer by the first network device. In this way, a range of the TCP window is calculated more accurately. In particular, when the transmission delay of the outbound interface used by the first network device to send the service packet is relatively high, or the processing delay of processing the service packet in the occupied buffer by the first network device is relatively high, a range of the TCP window obtained through calculation is more accurate such that a user service requirement can be met more accurately.

In a possible implementation, the TCP window that is calculated using the foregoing formula further meets the following formula:

$$\text{window} \leq B - \text{currentB}.$$

When the first network device calculates the TCP window, a remaining buffer size of the first network device is B−currentB. Therefore, the first network device may store only packets of the remaining buffer size at most. This formula is used as a supplement to calculate the TCP window, and a loss of service packets may be reduced to some extent.

In a possible implementation, the first network device sends the service identifier to a controller that stores a correspondence between the service identifier and the service requirement information. The controller obtains the service requirement information based on the service identifier and the correspondence, and sends the service requirement information to the first network device. The first network device receives the service requirement information sent by the controller.

In a possible implementation, the first network device directly stores a correspondence between the service identifier and the service requirement information, and the first network device obtains the service requirement information from the correspondence using the service identifier.

In a possible implementation, when the priority of the service is the first priority, and the occupied buffer size in the buffer of the first network device is greater than or equal to a first threshold, the first network device obtains the service requirement information of the service and calculates the TCP window based on the service requirement information.

In the foregoing manner, the first network device calculates the TCP window based on the service requirement information only when the occupied buffer size in the buffer of the first network device is greater than or equal to the first threshold. Therefore, this avoids excessive occupation of a network resource caused by frequent calculation of the TCP window.

In a possible implementation, that the first network device obtains the TCP window based on the priority of the service includes, when the first network device determines that the priority of the service is a second-priority service, and the occupied buffer size in the buffer of the first network device is greater than or equal to a second threshold, a value of the TCP window is 0, or the TCP window is set to a smaller value, where the smaller value only needs to ensure that the service will not be interrupted, the first priority is greater than the second priority, and a service corresponding to the second priority is a low-priority service.

In the foregoing manner, when the first network device determines that the service is the low-priority service, and the occupied buffer size of the first network device reaches the second threshold, the TCP window is 0 or a smaller value. In this way, properly restraining sending of the low-priority service packets can reduce the loss of packets such that more resources can be reserved for a transmission of the high-priority service.

In a possible implementation, when the first network device determines that the priority of the service is the first priority, and the occupied buffer size in the buffer of the first network device is greater than or equal to the second threshold, the first network device sends the service identifier to the controller, and the first network device receives the TCP window that is calculated by the controller based on the service requirement information of the service. The controller performs centralized control on devices in the network, and the controller stores the requirement information of the service, and therefore, the controller can more flexibly calculate the TCP window for the managed network devices.

In a possible implementation, the method further includes receiving, by the first network device, a flow table sent by the controller, where the flow table is used to provide guidance for the first network device to send the first TCP ACK packet to the second network device, adding, by the first network device, the TCP window to the flow table, when the first network device sends the first TCP ACK packet to the second network device, obtaining, by the first network device, the TCP window from the flow table, and adding the TCP window to the first TCP ACK packet. The TCP window is added to the flow table such that when the first TCP ACK packet is sent, the TCP window can be directly obtained from the flow table, and the forwarding efficiency of the first TCP ACK packet is higher.

In a possible implementation, the method further includes receiving, by the first network device, the service packet sent by the second network device, where a size of a payload part of the service packet is the TCP window, or an overall size of the service packet is the TCP window.

In a possible implementation, the TCP packet is a TCP synchronization (SYN) packet or a TCP service packet, and the TCP service packet carries the service packet of a user.

In a possible implementation, a rate of an interface used by the first network device to receive the TCP service packet from the second network device is a first rate, and a rate of an interface used by the first network device to send the TCP service packet to the third network device is a second rate, where the first rate is greater than the second rate.

According to a second aspect, an embodiment of the present disclosure provides a method for sending a service packet. The method includes receiving, by a controller, a service identifier sent by a first network device, determining, by the controller, a priority of a service corresponding to the service identifier based on the service identifier, calculating, by the controller, a TCP window based on the priority of the service, and sending the TCP window to the first network device, to trigger the first network device to send the TCP window to a second network device, where the TCP window is used by the second network device to calculate a size of a service packet to be sent to the first network device.

In the foregoing manner, the controller calculates the TCP window based on the service priority. Because the TCP window is calculated based on the service priority, different transmission requirements of services of different priorities can be met, and a size of a packet sent by a transmit end can be flexibly controlled, thereby reducing a loss of service packets.

In a possible implementation, when the priority of the service is a first priority, the controller obtains, based on the service identifier, the service requirement information corresponding to the service, and the controller calculates the TCP window based on the service requirement information.

In a possible implementation, the service requirement information includes a throughput, and the throughput is used to identify traffic of a corresponding service that needs to be transmitted by the first network device within a unit time, and that the controller calculates a TCP window based on the service requirement information, including calculating the TCP window based on the throughput and the occupied buffer size in the buffer of the first network device.

In a possible implementation, the controller calculates the TCP window using the following formula:

$$\text{Throughput} * \frac{currentB}{C} \le \text{window} < \text{Throughput} * \frac{B}{C},$$

where Throughput is a throughput included in the service requirement information, B is a size of the buffer of the first network device, including an occupied buffer size and an unoccupied buffer size, currentB is the occupied buffer size in the buffer of the first network device, when the first network device is the receive end of the service packet, C is a rate of reading a queue from the buffer by the first network device, or when the first network device is an intermediate device on a service packet transmission path, C is a transmission rate of an outbound interface used by the first network device to send the service packet, and window is the TCP window that needs to be calculated.

In a possible design, the controller calculates the TCP window using the following formula:

$$\text{Throughput} * \left(\frac{currentB}{C} + \Delta t\right) \le \text{window} < \text{Throughput} * \left(\frac{B}{C} + \Delta t\right),$$

where Throughput is the throughput, B is the size of the buffer of the first network device, currentB is the occupied buffer size in the buffer of the first network device, when the first network device is the receive end of the service packet, C is a rate of reading a queue from the buffer by the first network device, or when the first network device is an intermediate device on a service packet transmission path, C is a transmission rate of an outbound interface used by the first network device to send the service packet, window is the TCP window that needs to be calculated, and when the first network device is the receive end of the service packet, $\Delta t$ is a processing delay of processing a service packet in the occupied buffer by the first network device. When the first network device is an intermediate device on the service packet transmission path, $\Delta t$ is a transmission delay of an outbound interface used by the first network device to send the service packet.

In a possible implementation, the TCP window further meets the following formula $$\text{window} < B - currentB.$$

According to a third aspect, an embodiment of the present disclosure provides a network device for sending a service packet, to perform the method in any one of the first aspect or the possible implementations of the first aspect. The network device includes a unit configured to perform the method in the first aspect or any possible implementation of the first aspect.

According to a fourth aspect, an embodiment of the present disclosure provides a controller for sending a service packet, to perform the method in any one of the second aspect or the possible implementations of the second aspect. The controller includes a unit configured to perform the method of the second aspect or any possible implementation of the second aspect.

According to a fifth aspect, a network device is provided, where the network device includes a processor, a network interface, and a memory. The memory may be configured to store program code. The processor is configured to invoke the program code in the memory to perform the method in the first aspect or any possible implementation of the first aspect. For details, refer to detailed descriptions in the method example. Details are not described herein again.

According to a sixth aspect, a controller is provided, where the controller includes a processor, a network interface, and a memory. The memory may be configured to store program code. The processor is configured to invoke the program code in the memory to perform the method in the second aspect or any possible implementation of the second aspect. For details, refer to detailed descriptions in the method example. Details are not described herein again.

According to a seventh aspect, a network device is provided, where the network device includes a main control board and an interface board. The main control board includes a first processor and a second memory. The interface board includes a second processor, a second memory, and an interface card. The second memory may be configured to store program code. The second processor is configured to invoke the program code in the second memory to perform the following operations of receiving a TCP packet sent by the second network device, where the TCP packet includes a service identifier, and sending the service identifier to the main control board.

The first memory may be configured to store program code. The first processor is configured to invoke the program code in the first memory to perform the following operations receiving a service identifier sent by an interface board, and obtaining, based on the service identifier, a priority of a service corresponding to the service identifier, and obtaining the TCP window based on the priority of the service.

The second processor is further configured to invoke the program code in the second memory to perform the following operation sending a TCP ACK packet to the second network device, where the TCP ACK packet includes a TCP window.

In a possible implementation, an inter-process communication (IPC) control channel is established between the main control board and the interface board.

According to an eighth aspect, a system for sending a service packet is provided, where the system includes the first network device and the second network device that are provided in the foregoing aspects. The second network device is configured to send a TCP packet to the first network device, where the TCP packet includes a service identifier, receive a TCP ACK packet sent by the first network device, and calculate, based on a TCP window in the TCP ACK packet, a size of a service packet to be sent to the first network device.

According to a ninth aspect, a computer storage medium is provided, where the computer storage medium is configured to store a computer software instruction used by the foregoing network device or the controller, and includes a program designed to perform the foregoing aspects.

BRIEF DESCRIPTION OF DRAWINGS

To describe some of the technical solutions in the present disclosure more clearly, the following briefly describes the accompanying drawings used in the embodiments. The accompanying drawings in the following description merely show some embodiments of the present disclosure, and a person of ordinary skill in the art can derive other technical solutions and accompanying drawings of the present disclosure from these accompanying drawings without creative efforts.

DESCRIPTION OF EMBODIMENTS

The following describes the embodiments of the present disclosure with reference to accompanying drawings.

Figure 1:
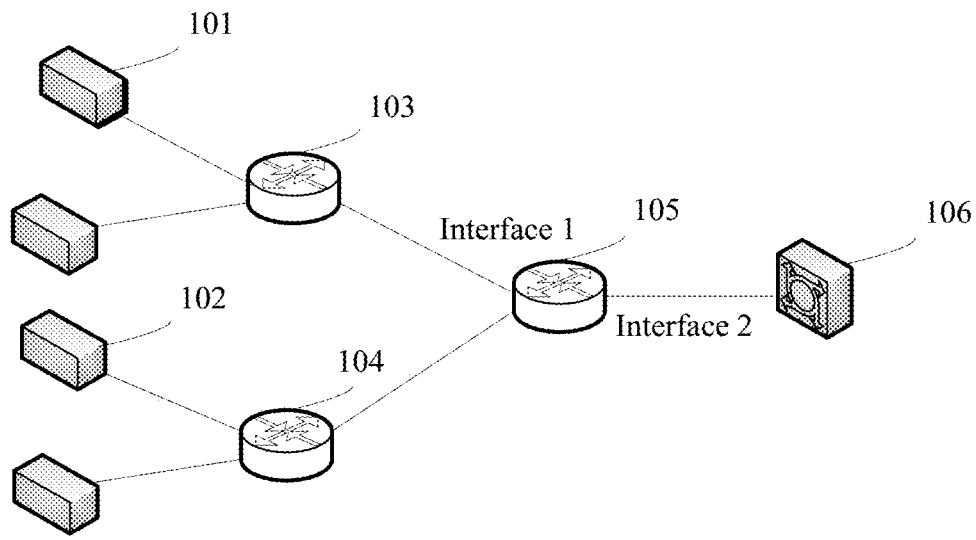
FIG. 1 is a schematic diagram of an application scenario according to an embodiment of the present disclosure.

FIG. 1 shows a possible application scenario according to an embodiment of the present disclosure. In this application scenario, a device 101 and a device 102 are user devices, for example, a mobile phone or a personal computer, a device 103 and a device 104 are user access devices, for example, an optical line terminal (OLT) or an optical network unit (ONU), a device 105 is a forwarding device in a network, for example, a router or a switch, and a device 106 is a server in the network, for example, a content delivery network (CDN) server. An interface 1 and an interface 2 are two physical interfaces of the device 105. When a transmission rate of the interface 1 is greater than that of the interface 2, for example, when the transmission rate of the interface 1 is 3000 megabits per second (Mbit/s) and the transmission rate of the interface 2 is 1000 Mbit/s, if the device 101 sends high service traffic to the server 106 within a unit time, the service traffic may smoothly pass through the interface 1 and reach the device 105. However, because the transmission rate of the interface 2 is lower than that of the interface 1, service traffic will be accumulated on the device 105. When an entire buffer of the device 105 is occupied, packets of the service traffic may be lost. In another scenario, if a plurality of devices 101 and/or a plurality of devices 102 send service traffic to the device 106 within a unit time, the service traffic may also be accumulated on the device 105. When the entire buffer of the device 105 is occupied, packets of the service traffic may be lost.

Embodiments of the present disclosure provide a method for sending a service packet, and a network device and a system based on this method. In this method, a TCP window is obtained based on a priority of a service, to flexibly control a size of a service packet sent by a transmit end, and reduce the loss of service packets while a service packet transmission requirement is met. The method, the network device, and the system are based on a same disclosure concept. The method, the network device, and the system have similar principles for resolving problems. Therefore, for implementation of the network device and the method, reference may be made to each other, and for implementation of the system and the method, reference may also be made to each other. No repeated description is provided.

Figure 2:
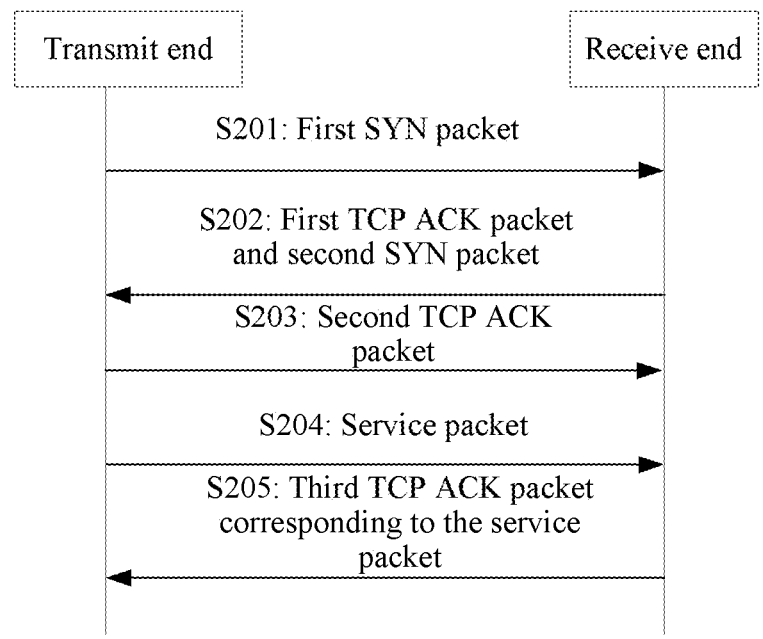
FIG. 2 is a method for establishing a TCP connection and sending a packet between devices according to an embodiment of the present disclosure.

Based on the application scenario shown in FIG. 1, with reference to FIG. 2, an embodiment of the present disclosure provides a method for establishing a connection and sending a packet based on TCP when devices transmit a service packet with each other using the TCP. A transmit end in FIG. 2 may be the device 101 or the device 102 in FIG. 1, and a receive end may be the device 106 in FIG. 1. The method includes the following steps:

S201. A service packet transmit end sends a first SYN packet to a service packet receive end, where the first SYN packet includes a SYN field, and a value of the synchronize field is 1. When the value of the syn field is 1, it indicates that a TCP connection is established between the transmit end and the receive end. The first SYN packet further includes a first sequence number (SN), where a value of the first SN may be a random value.

S202. After receiving the first SYN packet, the receive end sends a first TCP ACK packet to the transmit end, where the first TCP ACK packet includes an acknowledge number (ack number) field, and the value of the ack number is the value of the first SN plus 1. The receive end further sends a second SYN packet to the transmit end, where the second SYN packet includes a second SN, and the value of the second SN may also be a random value. The receive end can put the first TCP ACK packet and the second SYN packet in a same packet and send it to the transmit end, or the receive end may send the first TCP ACK packet and the second SYN packet separately to the transmit end.

S203. The transmit end receives the first TCP ACK packet and the second SYN packet that are sent, and after determining that the ack number included in the first TCP ACK packet is the first SN plus 1, the transmit end sends a second TCP ACK packet to the receive end, where the value of an ack number included in the second TCP ACK packet is the second SN plus 1. When the receive end determines that the ack number in the second TCP ACK packet is the second SN plus 1, establishment of the TCP connection between the transmit end and the receive end is completed.

S204. The transmit end sends a service packet to the receive end.

S205. After receiving the service packet sent by the transmit end, the receive end sends a third TCP ACK packet to the transmit end, where the third TCP ACK packet is used to indicate that the service packet sent by the transmit end has been correctly received.

Figure 3A:
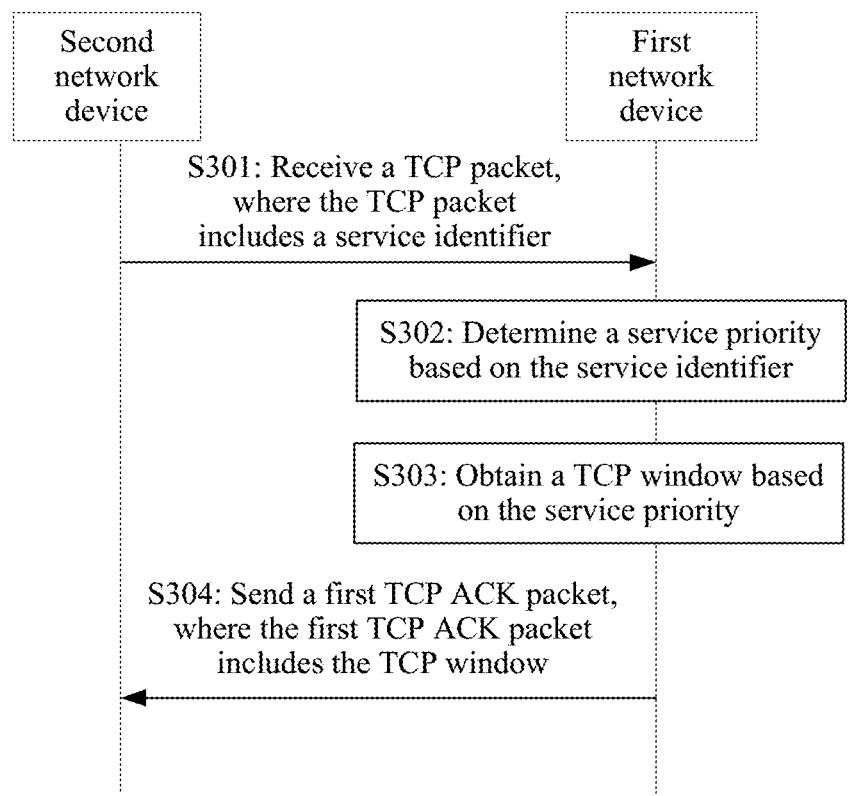
FIG. 3A is a schematic flowchart of a method for sending a service packet according to an embodiment of the present disclosure.

FIG. 3A shows a method for sending a service packet provided in an embodiment of the present disclosure. Referring to FIG. 3A, the method includes the following steps:

S301. A first network device receives a TCP packet sent by a second network device, where the TCP packet includes a service identifier.

In an example, the first network device is the receive end in the method shown in FIG. 2, and the second network device is the transmit end in the method shown in FIG. 2.

In an example, the TCP packet may be an SYN packet sent by the second network device to the first network device in a TCP connection process, for example, the first SYN packet in S201 in FIG. 1.

In an example, the TCP packet may be a TCP service packet to be sent to the first network device after a TCP connection is established between the second network device and the first network device, for example, the service packet in S204 in FIG. 1. The TCP service packet carries a specific service.

In an example, the service identifier is used to identify a service, and the service identifier may be a flow label (FL) or a service label.

In an example, if the second network device runs only one service, the service identifier includes a destination Internet Protocol (IP) address, or if the second network device runs a plurality of services at the same time, to distinguish between different services, the service identifier includes a destination IP address and a destination port, or the service identifier includes a destination IP address, a destination port, a source IP address, and a source port.

S302. The first network device determines, based on the service identifier, a priority of a service corresponding to the service identifier.

Figure 6:
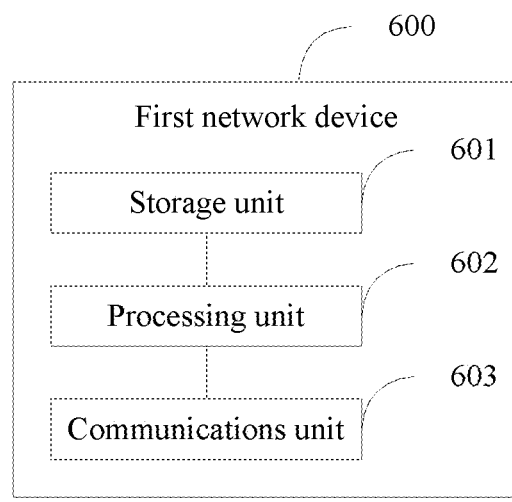
FIG. 6 is a schematic structural diagram of a first network device according to an embodiment of the present disclosure.

In an example, the first network device is a device corresponding to a destination address of the service packet, that is, the first network device is a receive end of the service packet, for example, the first network device is the device 106 in FIG. 6, or the first network device is an intermediate device on a service packet transmission path, for example, the first network device is the device 105 in FIG. 1. When the first network device is the receive end of the service packet, the first network device may obtain service identifier in the following three manners:

Manner 1: The service identifier is obtained from the TCP SYN packet that is sent by the second network device to the first network device and that is used to establish the TCP connection, for example, the service identifier is obtained from the first SYN packet in the S201 part in FIG. 2.

Manner 2: The service identifier is obtained from the TCP ACK packet that is sent by the second network device to the first network device and that is used to establish the TCP connection, for example, the service identifier is obtained from the second TCP ACK packet in the S203 part in FIG. 2.

Manner 3: The service identifier is obtained from the service packet that is sent by the second network device to the first network device, for example, the service identifier is obtained from the service packet in the S204 part in FIG. 2.

In an example, the first network device has already pre-stored a correspondence between the service identifier and a service priority. After receiving the TCP packet, the first network device can directly use the correspondence between the service identifier and the service priority to obtain the priority of the service corresponding to the service identifier.

For another implementation for the first network device to obtain the priority of the service corresponding to the service identifier based on the service identifier, refer to specific description in the embodiment shown in the following FIG.

Figure 3B:
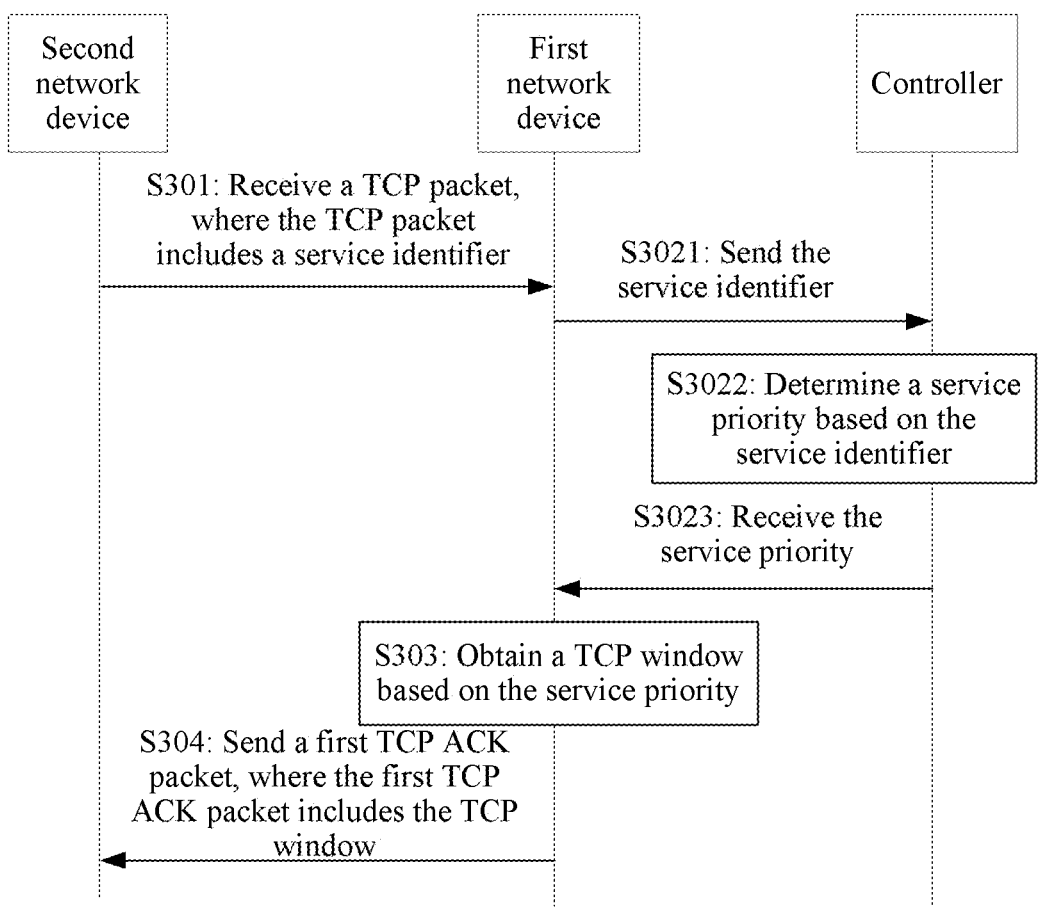
FIG. 3B is a schematic flowchart of a method for obtaining a priority of a service according to an embodiment of the present disclosure.

3B. It can be understood that FIG. 3B provides only an example implementation, and this application does not impose any limitation on the manner of obtaining the priority of the service based on the service identifier, and does not provide details about another manner that a person skilled in the art can figure out on the basis of reading the content of this application.

S303. The first network device obtains a TCP window based on the priority of the service. In the embodiment of the present disclosure, the TCP window further refers to the size of the TCP window or the value of the TCP window.

Figure 3C:
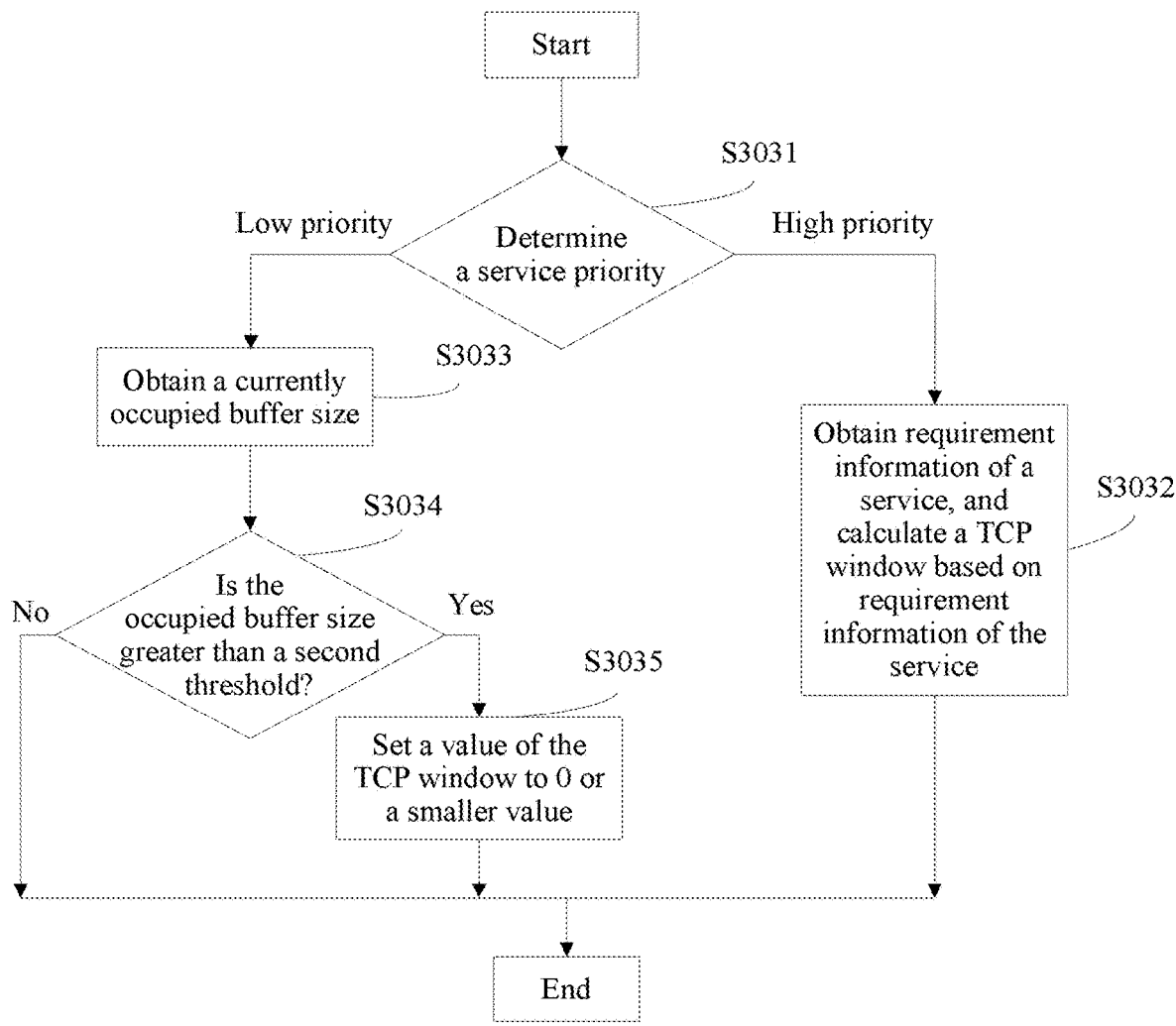
FIG. 3C is a schematic flowchart of a method for obtaining a TCP window based on a priority of a service according to an embodiment of the present disclosure.

For a manner of obtaining the TCP window by the first network device based on the priority of the service, refer to specific description in an embodiment of FIG. 3C below. It can be understood that FIG. 3C provides only an example implementation, and this application does not impose any limitation on the manner of obtaining the TCP window, and does not provide details about another manner that a person skilled in the art can figure out on the basis of reading the content of this application.

S304. The first network device sends the first TCP ACK packet to the second network device, where the first TCP ACK packet includes the TCP window.

Based on the method shown in FIG. 3A, an embodiment of the present disclosure provides a method for sending a service packet. Further, referring to FIG. 3B, an implementation in which a first network device obtains a TCP window based on a service identifier is provided. The method includes the following steps:

S301. The first network device receives a TCP packet sent by a second network device, where the TCP packet includes the service identifier.

S3021. After receiving the TCP packet, the first network device sends the service identifier in the TCP packet to a controller.

The controller stores a correspondence between the service identifier and a service priority. Optionally, the first network device may first obtain the service identifier in the TCP packet, and then send the service identifier to the controller. Alternatively, the first network device may directly make a copy of the TCP packet, and then send the copied TCP packet to the controller, and the controller obtains the service identifier based on the TCP packet.

S3022. After obtaining the service identifier, the controller obtains, based on a correspondence between the service identifier and the service priority, a priority of the service corresponding to the service identifier, and then sends the priority of the service to the first network device.

S3023. The first network device receives the priority of the service that corresponds to the service identifier and that is sent by the controller.

In this embodiment of the present disclosure, the controller controls or manages a network device in a network. The controller may be a network management device or a controller in a software-defined networking (SDN) architecture. The network device in the embodiment of the present disclosure may be a router or a switch, or a forwarder under the SDN architecture.

S303. The first network device obtains the TCP window based on the priority of the service.

S304. The first network device sends a first TCP ACK packet to the second network device, where the first TCP ACK packet includes the TCP window.

In an example, the first network device receives a flow table sent by the controller, where the flow table is used to instruct the first network device to send the first TCP ACK packet to the second network device. The first network device stores the flow table delivered by the controller, and the first network device adds the obtained TCP window to the flow table. When the first network device needs to send the TCP window to the second network device, the first network device first obtains the TCP window from the flow table that includes the TCP window and that is stored in the first network device, then adds the TCP window to the first TCP ACK packet, and sends the first TCP ACK packet to the second network device.

FIG. 3C is a method for obtaining a TCP window based on a service priority according to an embodiment of the present disclosure. The method may be applied to step S303 in the embodiment shown in FIG. 3A or FIG. 3B. As shown in FIG. 3C, the method includes the following steps:

S3031. A computing device determines a priority of a service, that is, determines whether the priority of the service is a high priority or a low priority. Optionally, the computing device is a first network device or a controller in this embodiment of the present disclosure.

S3032. When the priority of the service is a first priority, the computing device calculates a TCP window, where a service corresponding to the first priority is a high-priority service.

In an example, in step S3032, the computing device is the first network device. When determining that the priority of the service is the first priority, the first network device obtains service requirement information of the service, and calculates the TCP window based on the service requirement information.

In an example, when the computing device is the first network device, the first network device may obtain the service requirement information of the service in the following two manners:

Manner 1: The first network device sends a service identifier to the controller, where the controller stores a correspondence between the service identifier and the service requirement information. After receiving the service identifier, the controller determines the corresponding service requirement information based on the service identifier, and then sends the service requirement information to the first network device. The first network device may make a copy of a TCP packet, and then send the copied TCP packet to the controller, and the controller obtains the service identifier based on the copied TCP packet. Alternatively, the first network device first parses the TCP packet to obtain the service identifier from the TCP packet, and then sends the service identifier to the controller.

Manner 2: The first network device pre-stores a correspondence between the service identifier and the service requirement information, and after determining that the priority of the service is the high priority, the first network device obtains the service requirement information from the correspondence.

In an example, when the first network device determines that the priority of the service is the first priority, and an occupied buffer size in a buffer of the first network device is greater than or equal to a first threshold, the first network device obtains the service requirement information of the service, and calculates the TCP window based on the service requirement information. In this embodiment of the present disclosure, the size of the buffer may also be understood as a value of the buffer. The first threshold is a preset value. For example, a size of a buffer of the first network device is 100 M (Mbit/s), and a value of the first threshold may be 70 M. When the occupied buffer size in the buffer of the first network device is greater than or equal to 70 M, the service requirement information of the service is obtained. In the foregoing manner, the first network device calculates the TCP window based on the service requirement information only when determining that the occupied buffer size in the buffer of the first network device is greater than or equal to the first threshold. Therefore, this avoids excessive occupation of a network resource caused by frequent calculation of the TCP window.

For specific calculation of the TCP window based on the service requirement information, refer to the following detailed description.

S3033. When the priority of the service is a second priority, the computing device obtains an occupied buffer size in the buffer of the first network device, where the first priority is greater than the second priority, and a service corresponding to the second priority is a low-priority service.

S3034. The computing device determines whether an occupied buffer size in the buffer of the first network device is greater than or equal to a second threshold. Optionally, the buffer of the first network device refers to a total buffer size of the first network device.

S3035. When the occupied buffer size in the buffer of the first network device is greater than or equal to a second threshold, the computing device sets the TCP window to 0, or sets the TCP window to a smaller value. A value of the smaller value needs to ensure that the service is not interrupted. For example, the smaller value may be 10 thousand (K) or 100K. The second threshold is a preset value. For example, a size of a buffer of the first network device is 100 million (M), and a value of the second threshold may be 80 M. When the occupied buffer size in the buffer of the first network device is greater than or equal to 80 M, the TCP window is set to 0, or the TCP window is set to a smaller value. Values of the first threshold and the second threshold may be the same or different.

In an example, when the computing device determines that the occupied buffer size in the buffer of the first network device is less than the second threshold, the value of the TCP window is a default value. For example, the value of the TCP window may be a TCP window obtained through the latest calculation or a specific value.

In an example, in step S3032, the computing device is the first network device. In another example, the computing device may alternatively be the controller. In an implementation in which the controller is a computing device, when the first network device determines that the priority of the service is the first priority, the first network device sends a notification message to the controller, and the controller calculates the TCP window. The controller determines the service requirement corresponding to the service identifier based on the stored correspondence between the service identifier and the service requirement information, and calculates the TCP window based on the service requirement information. For a specific process of calculating the TCP window by the controller, refer to the following embodiment shown in FIG. 4.

In an example, the service requirement information includes a throughput, and the throughput is used to identify traffic that is of a service corresponding to the service identifier and that needs to be transmitted by the first network device within a unit time. The computing device calculates the TCP window based on the throughput and an occupied buffer size in the buffer of the first network device. The computing device calculates the TCP window in the following two manners:

Manner 1: The computing device calculates the TCP window using the following formula:

$$\text{Throughput} * \frac{currentB}{C} \leq \text{window} < \text{Throughput} * \frac{B}{C},$$

where Throughput is the throughput, B is a size of the buffer of the first network device, and the buffer includes an occupied buffer size and an unoccupied buffer size that are of the first network device, currentB is the occupied buffer size in the buffer of the first network device, when the first network device is the receive end of the service packet, C is a rate of reading a queue from the buffer by the first network device, or when the first network device is an intermediate device on a service packet transmission path, C is a transmission rate of an outbound interface used by the first network device to send the service packet, and window is the TCP window that needs to be calculated.

The computing device can obtain a TCP window range through calculation using the foregoing formula. All TCP windows in the range can meet a throughput requirement of the service, and the TCP window can be flexibly adjusted. For example, when a buffer occupation rate of the first network device exceeds a specific threshold, for example, 80%, a TCP window may be selected to be a smaller value in the range obtained through calculation using the foregoing formula, for example, a minimum value. If the buffer occupation rate of the first network device is less than a specific threshold, for example, 40%, a TCP window may be selected to be a larger value in the range obtained through calculation using the foregoing formula, for example, a maximum value. In this way, the buffer of the first network device is avoided from being excessively occupied while the TCP window can be flexibly adjusted to meet a user service requirement such that a loss of service packets is reduced.

Manner 2: The computing device calculates the TCP window by using the following formula:

$$\text{Throughput} * \left(\frac{currentB}{C} + \Delta t\right) \leq \text{window} < \text{Throughput} * \left(\frac{B}{C} + \Delta t\right),$$

where Throughput is the throughput, B is the size of the buffer of the first network device, currentB is the occupied buffer size in the buffer of the first network device, when first network device is the receive end of the service packet, C is a rate of reading a queue from the buffer by the first network device, or when the first network device is an intermediate device on a service packet transmission path, C is a transmission rate of an outbound interface used by the first network device to send the service packet, and window is the TCP window that needs to be calculated.

When the first network device is the receive end of the service packet, for example, the first network device is the device 106 in FIG. 1, the second network device may be the device 101 or the device 102 in FIG. 1, and Δt is a processing delay of processing a service packet in the occupied buffer by the first network device. When the first network device is an intermediate device on the service packet transmission path, for example, when the first network device is the device 105 in FIG. 1, the second network device may be the device 101 or the device 102 in FIG. 1, and Δt is a transmission delay of an outbound interface used by the first network device to send the service packet.

When calculating the TCP window, the computing device also uses a transmission delay of an outbound interface used by the first network device to send a service packet, or a processing delay of processing a service packet in the occupied buffer by the first network device. In this way, a range of the TCP window is calculated more accurately. In particular, when the transmission delay of the outbound interface used by the first network device to send the service packet is relatively high, or the processing delay of processing the service packet in the occupied buffer by the first network device is relatively high, a range of the TCP window obtained through calculation is more accurate such that a user service requirement can be met more accurately.

In an example, when the computing device calculates the TCP window in the foregoing two manners, a value of the TCP window further meets the following formula:

$$window < B - currentB.$$

When the first network device calculates the TCP window, a remaining buffer size of the first network device is B−currentB. Therefore, the first network device may store only packets of the remaining buffer size at most. This formula is used as a supplement to calculate the TCP window, and a loss of service packets may be reduced to some extent.

Figure 3D:
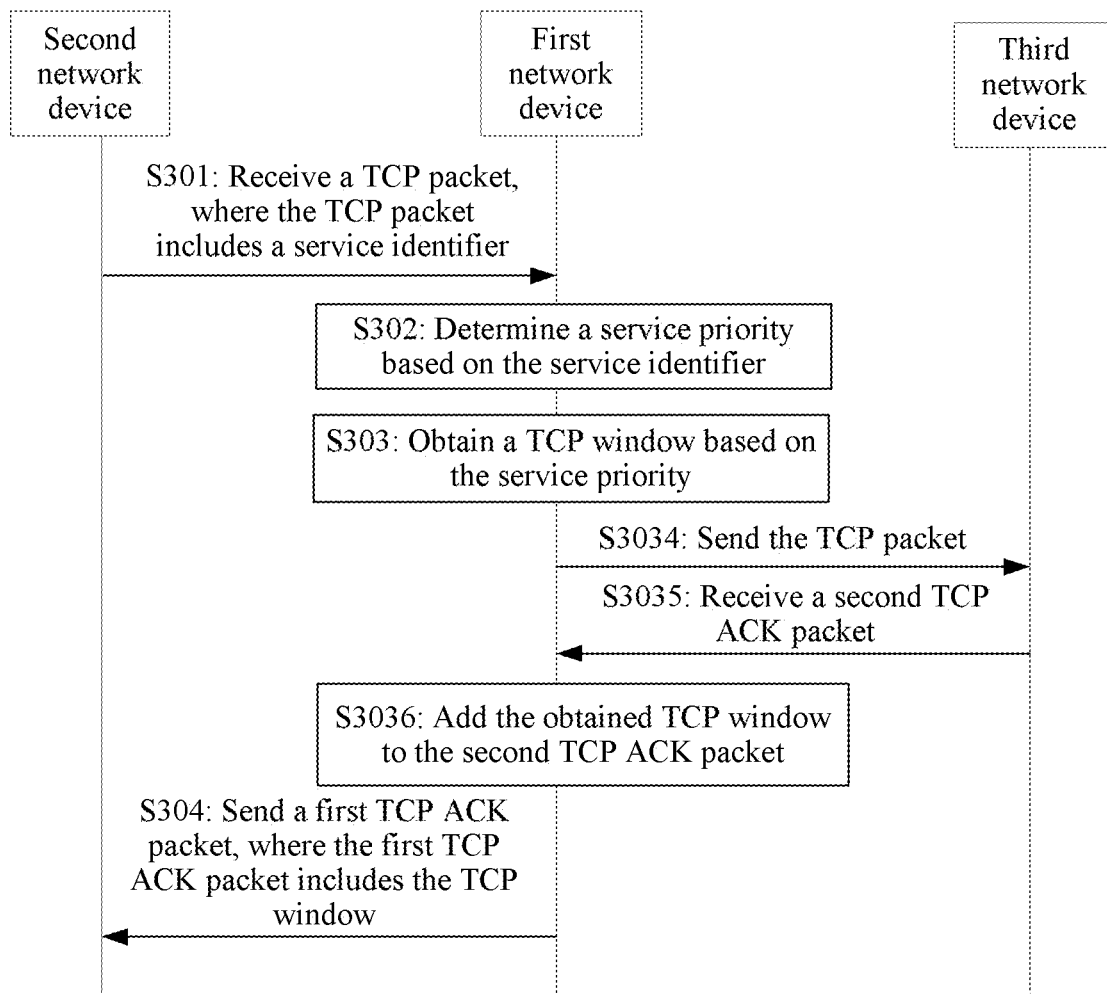
FIG. 3D is a schematic flowchart of a method for sending a service packet according to an embodiment of the present disclosure.

In an example, based on the method for sending a service packet shown in FIG. 3A, an embodiment of the present disclosure further provides a method for sending a service packet. FIG. 3D is a schematic flowchart of the method. Referring to FIG. 3D, the method includes the following steps:

S301. A first network device receives a TCP packet sent by a second network device, where the TCP packet includes a service identifier.

S302. The first network device obtains, based on the service identifier, a priority of a service corresponding to the service identifier.

S303. The first network device obtains a TCP window based on the priority of the service.

S3034. The first network device sends the TCP packet to a third network device.

S3035. The first network device receives a second TCP ACK packet sent by the third network device.

S3036. The first network device updates a TCP window in the second TCP ACK packet with the TCP window obtained in step S303, and generates a first TCP ACK packet.

S304. The first network device sends the first TCP ACK packet.

In this embodiment of the present disclosure, steps S301, S302, S303, and S304 are the same as steps S301, S302, S303, and S304 in FIG. 3A. For detailed content, refer to the embodiment shown in FIG. 3A. Details are not described herein again.

In this embodiment, the second network device is a transmit end of the service packet, the first network device is an intermediate device on a service packet transmission path, and the third network device is a receive end of the service packet. For example, the first network device is the device 105 in FIG. 1, the second network device is the device 101 or the device 102 in FIG. 1, and the third network device is the device 106 in FIG. 1. As the intermediate device on the transmission path, the first network device actively intercepts the TCP packet, calculates the TCP window based on the service priority, and replaces the TCP window with a TCP window in the TCP ACK packet sent by a service packet receive end such that a size of the service packet sent by the transmit end can be flexibly controlled. In addition, when the TCP window is calculated using the method shown in FIG. 3C, the first network device calculates the TCP window based on the occupation status of the buffer of the first network device and the service requirement information, thereby more accurately ensuring service transmission for the forwarded service.

In an example, steps S302 and S303 may be performed before or after step S3032, and this is not further limited in this embodiment of the present disclosure.

In an example, the first network device may obtain the service identifier in the following four manners:

Manner 1: The service identifier is obtained from the TCP SYN packet that is sent by the second network device to the third network device and that is used to establish the TCP connection, for example, the service identifier is obtained from the first SYN packet in the S201 part in FIG. 2.

Manner 2: The service identifier is obtained from a TCP SYN packet or a TCP ACK packet that is sent by the third network device to the first network device and that is used to establish a TCP connection, for example, the service identifier is obtained from the first ACK packet or the second SYN packet in the S202 part in the method shown in FIG. 2.

Manner 3: The service identifier is obtained from the TCP ACK packet that is sent by the second network device to the third network device and that is used to establish the TCP connection, for example, the service identifier is obtained from the second TCP ACK packet in the S203 part in FIG. 2.

Manner 4: The service identifier is obtained from the service packet that is sent by the second network device to the third network device, for example, the service identifier is obtained from the service packet in the S204 part in FIG. 2.

In an example, the first network device receives the packet through a high-speed interface, and sends the packet through a low-speed interface. For example, a rate at which the first network device receives the TCP service packet from the second network device is a first rate, a rate at which the first network device sends the TCP service packet to the third network device is a second rate, and the first rate is greater than the second rate.

In an example, after step S304 in the method shown in FIG. 3A, FIG. 3B, or FIG. 3D, the method may further include receiving, by the first network device, a service packet that corresponds to the service identifier and that is sent by the second network device. A size of a payload part of the service packet is the TCP window obtained in step S303, or a size of the entire service packet is the TCP window obtained in step S303.

In an example, when the first network device serves as the intermediate device on the service packet transmission path, the first network device further sends the service packet received from the second network device to the receive end of the service packet. For example, the first network device is the device 105 in FIG. 1, the second network device may be the device 101 or the device 102 in FIG. 1, and after receiving the service packet from the second network device, the first network device further sends the service packet to the device 106 in FIG. 1.

Figure 4:
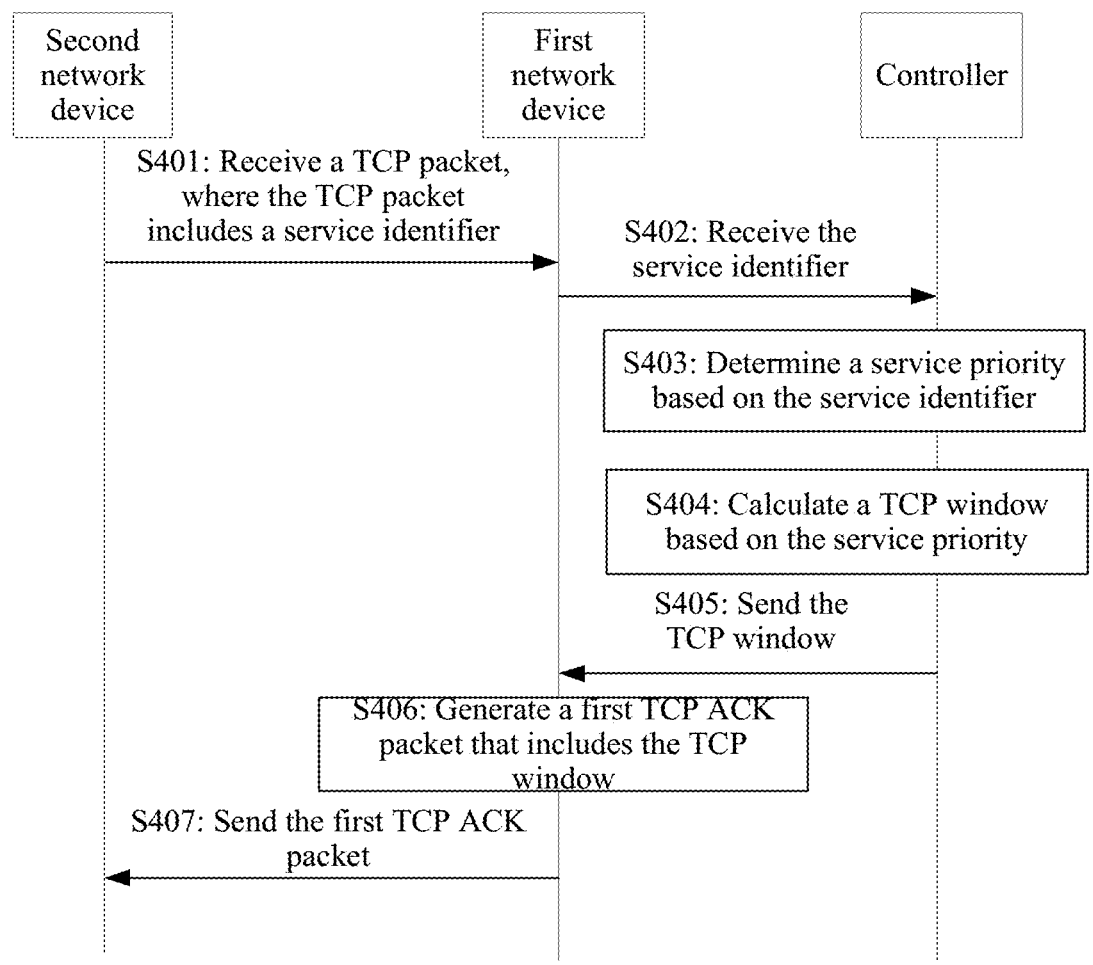
FIG. 4 is a schematic flowchart of a method for sending a service packet according to an embodiment of the present disclosure.

Based on the application scenario shown in FIG. 1, an embodiment of the present disclosure further provides a method for sending a service packet. Referring to FIG. 4, the method includes the following steps:

S401. A first network device receives a TCP packet sent by a second network device, where the TCP packet includes a service identifier. For a specific implementation, refer to step S301 in FIG. 3A, FIG. 3B, and FIG. 3D. Details are not described herein again.

S402. After receiving the TCP packet, the first network device sends the service identifier in the TCP packet to the controller, and correspondingly, the controller receives the service identifier. Optionally, the first network device may first obtain the service identifier in the TCP packet, and then send the service identifier to the controller. Alternatively, the first network device may directly make a copy of the TCP packet, and then send the copied TCP packet to the controller, and the controller obtains the service identifier based on the TCP packet. For details, refer to step S3021 in FIG. 3B.

S403. After obtaining the service identifier, the controller determines, based on a correspondence between the service identifier and the service priority, a priority of a service corresponding to the service identifier. For details about determining, based on a service identifier, a priority of a service corresponding to the service identifier, refer to step S302 in FIG. 3A or step S3022 in FIG. 3B. Details are not described herein again.

S404. The controller calculates a TCP window based on the service priority. For a specific calculation manner of calculating the TCP window based on the service priority, refer to the method shown in FIG. 3C. Details are not described herein again.

S405. The controller sends the TCP window to the first network device, and correspondingly, the first network device receives the TCP window.

S406. The first network device generates a first TCP ACK packet, where the first TCP ACK packet includes the TCP window.

S407. The first network device sends the first TCP ACK packet to the second network device, where the TCP window is used by the second network device to calculate a size of a service packet to be sent to the first network device.

In an example, the first network device is a receive end of the service packet, and the second network device is a transmit end of the service packet. For example, the first network device is the device 106 in FIG. 1, and the second network device may be the device 101 or the device 102 in FIG. 1.

In an example, the method shown in FIG. 4 further includes sending, by the first network device, the TCP packet to a third network device, and receiving a second TCP ACK packet sent by the third network device. The first network device updates the TCP window in the second TCP ACK packet with the TCP window obtained through calculation in step S404, and generates the first TCP ACK packet in step S406. In this example, the first network device is an intermediate device on a service packet forwarding path, the second network device is the transmit end of the service packet, and the third network device is the receive end of the service packet. The first network device may be the device 105 in FIG. 1, the second network device may be the device 101 or the device 102 in FIG. 1, and the third network device is the device 106 in FIG. 1.

In this embodiment of the present disclosure, the controller calculates the TCP window based on the service priority. Because the TCP window is calculated based on the service priority, different transmission requirements of services of different priorities can be met, and a size of a packet sent by a transmit end can be flexibly controlled, thereby reducing a loss of service packets.

Figure 5:
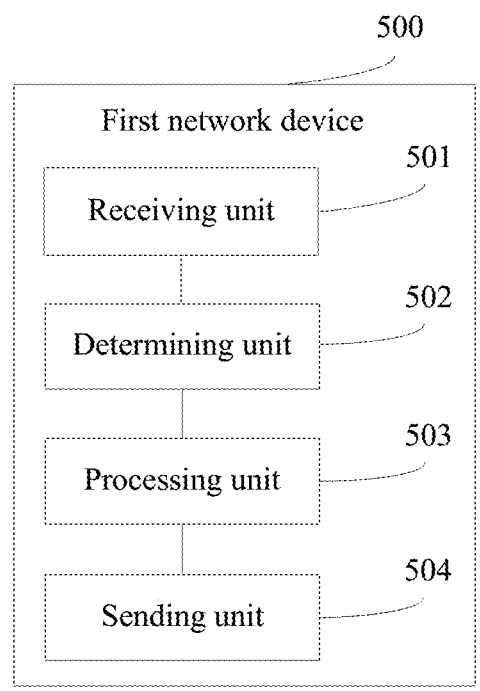
FIG. 5 is a schematic structural diagram of a first network device according to an embodiment of the present disclosure.

FIG. 5 is a possible schematic structural diagram of a first network device 500 used in the foregoing embodiments. The first network device 500 may implement functions of the first network device in the embodiment shown in FIG. 3A, FIG. 3B, FIG. 3C, FIG. 3D, or FIG. 4. Referring to FIG. 5, the first network device 500 includes a receiving unit 501, a determining unit 502, a processing unit 503, and a sending unit 504. These units may perform corresponding functions of the first network device in the foregoing method embodiments. The receiving unit 501 is configured to support the first network device 500 to perform a process S301 in FIG. 3A, processes S301 and S3023 in FIG. 3B, processes S301 and S3035 in FIG. 3D, and/or processes S401 and S405 in FIG. 4. The determining unit 502 is configured to support the first network device 500 to perform a process S302 in FIG. 3A and/or a process S302 in FIG. 3D. The sending unit 504 is configured to support the first network device 500 to perform a process S304 in FIG. 3A, processes S3021 and S304 in FIG. 3B, processes S3034 and S304 in FIG. 3D, and/or processes S402 and S407 in FIG. 4. The processing unit 503 is configured to support the first network device 500 to perform a process S303 in FIG. 3A, a process S303 in FIG. 3B, processes S3031, S3032, S3033, S3034, and S3035 in FIG. 3C, processes S303 and S3036 in FIG. 3D, a process S406 in FIG. 4, and/or another process performed by the first network device in the technology described in this specification. For example, the receiving unit 501 is configured to perform various information receiving functions performed by the first network device in the foregoing method embodiment. The determining unit 502 is configured to perform a determining action performed by the first network device in the foregoing method embodiment. The sending unit 504 is configured to perform various information sending functions performed by the first network device in the foregoing method embodiment. The processing unit 503 is configured to perform processing other than information receiving and sending and determining actions of the first network device in the foregoing method embodiment. For example, the receiving unit 501 is configured to receive a TCP packet sent by a second network device, where the TCP packet includes a service identifier. The determining unit 502 is configured to determine, based on the service identifier, a priority of a service corresponding to the service identifier. The processing unit 503 is configured to obtain a TCP window based on the priority of the service. The sending unit 504 is configured to send a first TCP ACK packet to the second network device, where the first TCP ACK packet includes the TCP window, and the TCP window is used by the second network device to calculate a size of a service packet to be sent to the first network device. For a specific execution process, refer to detailed descriptions of corresponding steps in the embodiment shown in FIG. 3A, FIG. 3B, FIG. 3C, FIG. 3D, or FIG. 4. Details are not described herein again.

When an integrated unit is used, FIG. 6 is a possible schematic structural diagram of a first network device 600 used in the foregoing embodiments. The first network device 600 may implement functions of the first network device in the embodiment shown in FIG. 3A, FIG. 3B, FIG. 3C, FIG. 3D, or FIG. 4. The first network device 600 includes a storage unit 601, a processing unit 602, and a communications unit 603. The communications unit 603 is configured to support communication between the first network device 600 and another network entity, for example, communication with the third network device or the controller shown in FIG. 3B, FIG. 3D, or FIG. 4. For example, the communications unit 603 is configured to support the first network device 600 to perform processes S301 and S304 in FIG. 3A, processes S301, S3021, S3023 and S304 in FIG. 3B, processes S301, S3034, S3035 and S304 in FIG. 3D, and/or processes S401, S402, S405 and S407 in FIG. 4. The processing unit 602 is configured to control and manage an action of the first network device 600. For example, the processing unit 602 is configured to support the first network device 600 to perform processes S302 and S303 in FIG. 3A, a process S303 in FIG. 3B, processes S3031, S3032, S3033, S3034, and S3035 in FIG. 3C, processes S302, S303, and S3036 in FIG. 3D, a process S406 in FIG. 4, and/or another process performed by the first network device in the technology described in this specification. The storage unit 601 is configured to store program code and data of the first network device 600. For a specific execution process, refer to detailed descriptions of corresponding steps in the embodiment shown in FIG. 3A, FIG. 3B, FIG. 3C, FIG. 3D, or FIG. 4. Details are not described herein again.

The processing unit 602 may be a processor, for example, a central processing unit (CPU), a general purpose processor, a digital signal processor (DSP), an application-specific integrated circuit (ASIC), a field programmable gate array (FPGA), or another programmable logical device, a transistor logical device, a hardware component, or a combination thereof. The processing unit 602 may implement or execute various example logical blocks, modules, and circuits described with reference to content disclosed in this embodiment of the present disclosure. Alternatively, the processor may be a combination for implementing a computing function, for example, a combination of one or more microprocessors, or a combination of a DSP and a microprocessor. The communications unit 603 may be a transceiver. The storage unit 601 may be a memory.

Figure 7:
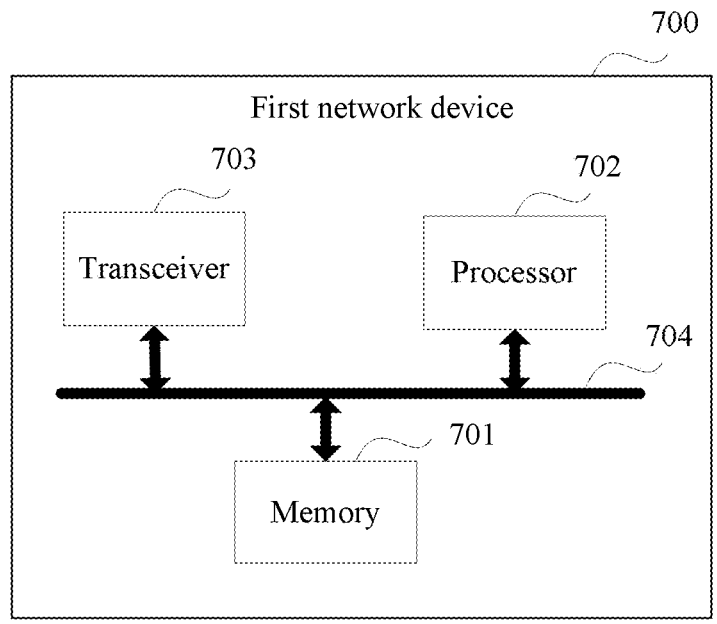
FIG. 7 is a schematic structural diagram of a first network device according to an embodiment of the present disclosure.

When the processing unit 602 is a processor, the communications unit 603 is a transceiver, and the storage unit 601 is a memory, the first network device used in this embodiment of the present disclosure may be a first network device 700 shown in FIG. 7.

Referring to FIG. 7, the first network device 700 includes a processor 702, a transceiver 703, a memory 701, and a bus 704. The processor 702, the transceiver 703, and the memory 701 are connected to each other using the bus 704. The bus 704 may be a peripheral component interconnect (PCI) bus, an extended industry standard architecture (EISA) bus, or the like. The bus 704 may be classified into an address bus, a data bus, a control bus, and the like. For ease of denotation, the bus 704 is indicated using only one thick line in FIG. 7. However, it does not indicate that there is only one bus or only one type of bus. The first network device 700 may implement functions of the first network device in the embodiment shown in FIG. 3A, FIG. 3B, FIG. 3C, FIG. 3D, or FIG. 4. The processor 702 and the transceiver 703 may perform corresponding functions of the first network device in the foregoing method example. The transceiver 703 is configured to support the first network device 700 to perform processes S301 and S304 in FIG. 3A, processes S301, S3021, S3023 and S304 in FIG. 3B, processes S301, S3034, S3035 and S304 in FIG. 3D, and/or processes S401, S402, S405 and S407 in FIG. 4. The processor 702 is configured to support the first network device 700 to perform processes S302 and S303 in FIG. 3A, a process S303 in FIG. 3B, processes S3031, S3032, S3033, S3034, and S3035 in FIG. 3C, processes S302, S303 and S3036 in FIG. 3D, a process S406 in FIG. 4, and/or another process performed by the first network device in the technology described in this specification. The memory 701 is configured to store program code and data of the first network device 700. For a specific execution process, refer to detailed descriptions of corresponding steps in the embodiment shown in FIG. 3A, FIG. 3B, FIG. 3C, FIG. 3D, or FIG. 4. Details are not described herein again.

Figure 8:
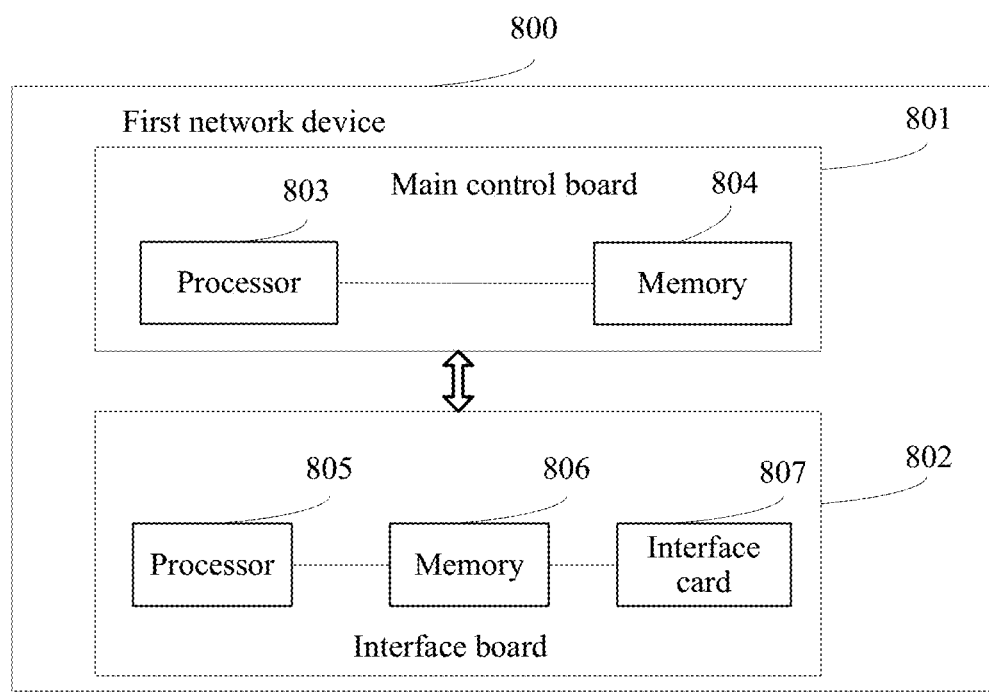
FIG. 8 is a schematic structural diagram of a first network device according to an embodiment of the present disclosure.

Referring to FIG. 8, an embodiment of the present disclosure provides another first network device 800. The first network device 800 may be a router, a switch, or a network device that has a forwarding function. The first network device 800 can implement functions of the first network device in the foregoing method embodiment. The first network device 800 includes a main control board 801 and an interface board 802. The main control board 801 includes a processor 803 and a memory 804. The interface board 802 includes a processor 805, a memory 806, and an interface card 807. The main control board 801 is coupled to the interface board 802.

This hardware may perform corresponding functions in the foregoing method example. For example, the memory 806 may be configured to store program code of the interface board 802. The processor 805 is configured to invoke the program code in the memory 806 to trigger the interface card 807 to perform various information sending and receiving functions performed by the first network device in the foregoing method embodiment. For example, the processor 805 invokes the program code in the memory 806 to trigger the interface card 807 to support the first network device 800 to perform processes S301 and S304 in FIG. 3A, processes S301, S3021, S3023 and S304 in FIG. 3B, processes S301, S3034, S3035 and S304 in FIG. 3D, and/or processes S401, S402, S405 and S407 in FIG. 4. The processor 805 is further configured to send the service identifier to the main control board 801. The memory 804 may be configured to store program code of the main control board 801, and the processor 803 is configured to invoke the program code in the memory 804 to perform processing other than information receiving and sending of the first network device in the foregoing method embodiment. For example, the processor 803 is configured to support the first network device 800 to perform processes S302 and S303 in FIG. 3A, a process S303 in FIG. 3B, processes S3031, S3032, S3033, S3034, and S3035 in FIG. 3C, processes S302, S303 and S3036 in FIG. 3D, a process S406 in FIG. 4, and/or another process performed by the first network device in the technology described in this specification. The memory 804 is configured to store program code and data of the main control board 801. For a specific execution process, refer to detailed descriptions of corresponding steps in the embodiment shown in FIG. 3A, FIG. 3B, FIG. 3C, FIG. 3D, or FIG. 4. Details are not described herein again.

In a possible implementation, an IPC control channel is established between the main control board 801 and the interface board 802, and communication is performed between the main control board 801 and the interface board 802 using the IPC control channel.

Figure 9:
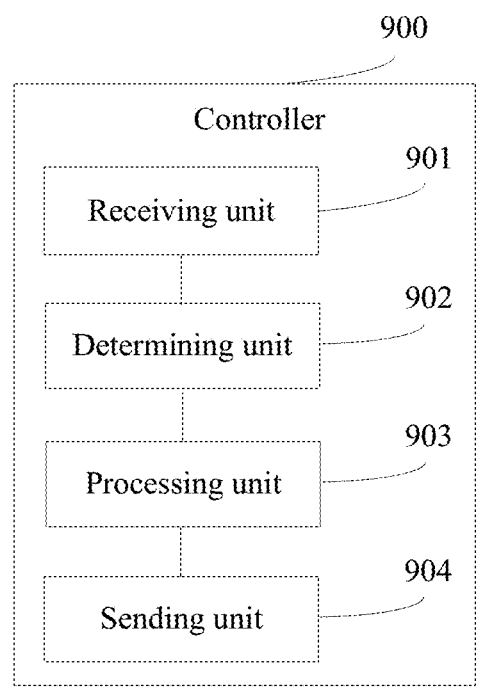
FIG. 9 is a schematic structural diagram of a controller according to an embodiment of the present disclosure.

FIG. 9 is a possible schematic structural diagram of the controller used in the foregoing embodiment. The controller may implement functions of the controller in the embodiment shown in FIG. 3B, FIG. 3C, or FIG. 4. Referring to FIG. 9, the controller 900 includes a receiving unit 901, a determining unit 902, a processing unit 903, and a sending unit 904. These units may perform corresponding functions of the controller in the foregoing method example. The receiving unit 901 is configured to support the controller 900 to perform a process S3021 in FIG. 3B and/or a process S402 in FIG. 4. The determining unit 902 is configured to support the controller 900 to perform a process S3022 in FIG. 3B and a process S403 in FIG. 4. The sending unit 904 is configured to support the controller 900 to perform a process S3023 in FIG. 3B and a process S405 in FIG. 4. The processing unit 903 is configured to support the controller 900 to perform processes S3031, S3032, S3033, S3034, and S3035 in FIG. 3C, a process S404 in FIG. 4, and/or another process performed by the controller in the technology described in this specification. For example, the receiving unit 901 is configured to perform various information receiving functions performed by the controller in the foregoing method embodiment. The determining unit 902 is configured to perform a determining action performed by the controller in the foregoing method embodiment. The sending unit 904 is configured to perform various information sending functions performed by the controller in the foregoing method embodiment. The processing unit 903 is configured to perform processing other than information receiving and sending and determining actions of the controller in the foregoing method embodiment. For example, the receiving unit 901 is configured to receive a service identifier sent by a first network device. The determining unit 902 is configured to determine, based on the service identifier, a priority of a service corresponding to the service identifier. The processing unit 903 is configured to calculate a TCP window based on the priority of the service. The sending unit 904 is configured to send the TCP window to the first network device such that the first network device sends the TCP window to a second network device, where the TCP window is used by the second network device to calculate a size of a service packet to be sent to the first network device. For a specific execution process, refer to detailed descriptions of corresponding steps in the embodiment shown in FIG. 3B, FIG. 3C, or FIG. 4. Details are not described herein again.

It should be noted that unit division in the embodiments of the present disclosure is an example, and is merely logical function division. There may be another division manner in actual implementation. Function units in the embodiments of the present disclosure may be integrated into one processing unit, or each of the units may exist alone physically, or two or more units are integrated into one unit. For example, in the foregoing embodiment, the receiving unit and the sending unit may be a same unit or different units. The integrated unit may be implemented in a form of hardware, or may be implemented in a form of a software functional unit.

Figure 10:
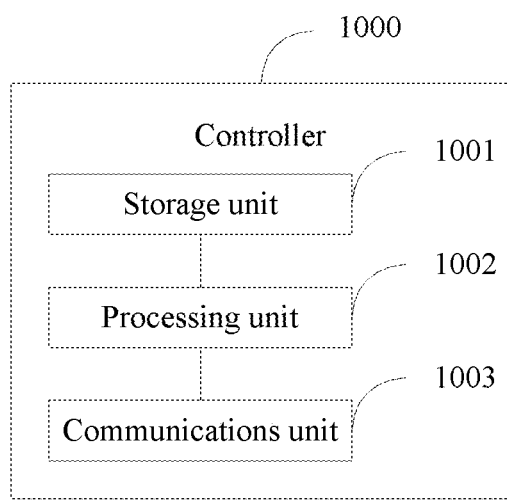
FIG. 10 is a schematic structural diagram of a controller according to an embodiment of the present disclosure.

When an integrated unit is used, FIG. 10 is another possible schematic structural diagram of the controller used in the foregoing embodiment. The controller 1000 may also implement functions of the controller in the embodiment shown in FIG. 3B, FIG. 3C, or FIG. 4.

The controller 1000 includes a storage unit 1001, a processing unit 1002, and a communications unit 1003. The communications unit 1003 is configured to support communication between the controller 1000 and another network entity, for example, is configured to support the controller 900 to perform processes S3021 and S3023 in FIG. 3B and processes S402 and S405 in FIG. 4. The processing unit 1002 is configured to control and manage an action of the controller 1000. For example, the processing unit 1002 is configured to support the controller 1000 to perform a process S3022 in FIG. 3B, processes S3031, S3032, S3033, S3034, and S3035 in FIG. 3C, a process S404 in FIG. 4, and/or another process performed by the controller in the technology described in this specification. The storage unit 1001 is configured to store program code and data of the controller 1000. For a specific processing process, refer to detailed descriptions of corresponding steps in the embodiment shown in FIG. 3B, FIG. 3C, or FIG. 4. Details are not described herein again.

The processing unit 1002 may be a processor, for example, may be a CPU, a general purpose processor, a DSP, an ASIC, an FPGA or another programming logical device, a transistor logic device, a hardware component, or any combination thereof. The processing unit 1002 may implement or execute various example logical blocks, modules, and circuits described with reference to content disclosed in this embodiment of the present disclosure. Alternatively, the processor may be a combination for implementing a computing function, for example, a combination of one or more microprocessors, or a combination of a DSP and a microprocessor. The communications unit 1003 may be a transceiver. The storage unit 1001 may be a memory.

Figure 11:
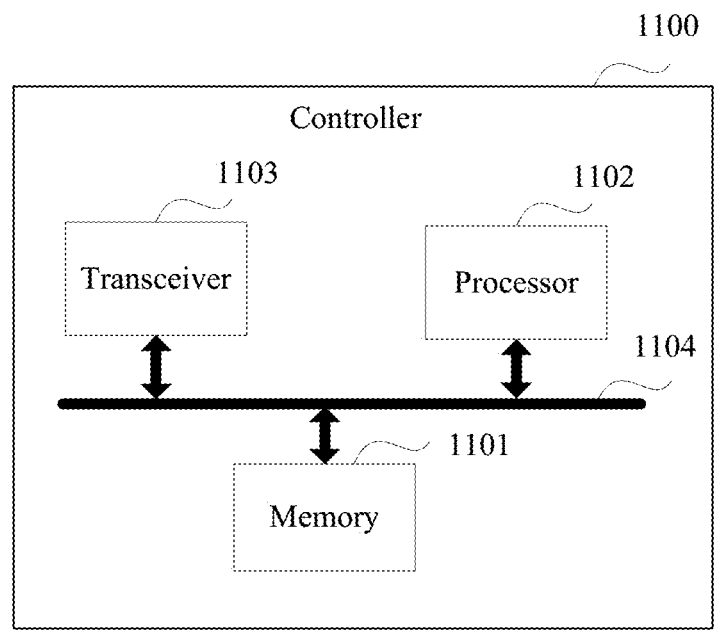
FIG. 11 is a schematic structural diagram of a controller according to an embodiment of the present disclosure.

When the processing unit 1002 is a processor, the communications unit 1003 is a transceiver, and the storage unit 1001 is a memory, the controller used in this embodiment of the present disclosure may be the controller 1100 shown in FIG. 11.

As shown in FIG. 11, the controller 1100 includes a processor 1102, a transceiver 1103, a memory 1101, and a bus 1104. The transceiver 1103, the processor 1102, and the memory 1101 are connected to each other using the bus 1104. The bus 1104 may be a PCI bus, an EISA bus, or the like. The bus 1104 may be classified into an address bus, a data bus, a control bus, and the like. For ease of denotation, the bus is indicated using only one thick line in FIG. 11. However, it does not indicate that there is only one bus or only one type of bus. The controller 1100 may implement functions of the controller in the embodiment shown in FIG. 3B or FIG. 4. The processor 1102 and the transceiver 1103 may perform corresponding functions of the controller in the foregoing method example. The transceiver 1103 is configured to support the controller 1100 to perform processes S3021 and S3023 in FIG. 3B, and/or processes S402 and S405 in FIG. 4. The processor 1102 is configured to support the controller 1100 to perform a process S3022 in FIG. 3B, processes S3031, S3032, S3033, S3034, and S3035 in FIG. 3C, a process S404 in FIG. 4, and/or another process performed by the controller in the technology described in this specification. The memory 701 is configured to store program code and data of the controller 1100. For a specific execution process, refer to detailed descriptions of corresponding steps in the embodiment shown in FIG. 3B or FIG. 4. Details are not described herein again.

Figure 12:
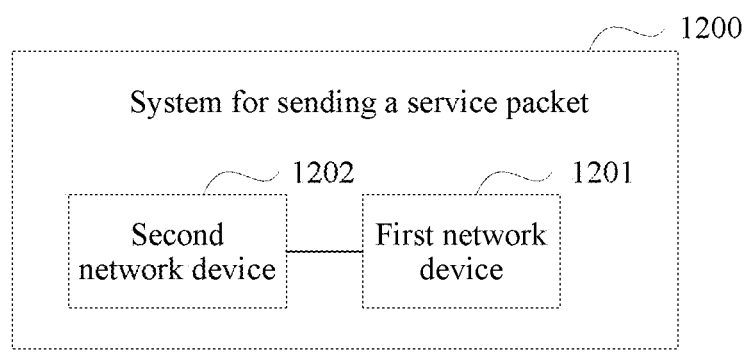
FIG. 12 is a schematic diagram of a system for sending a service packet according to an embodiment of the present disclosure.

Referring to FIG. 12, an embodiment of the present disclosure provides another system 1200 for sending a service packet. The system 1200 is configured to implement the method for sending a service packet in the foregoing method embodiment. The system 1200 includes a first network device 1201 and a second network device 1202. The first network device 1201 and the second network device 1202 may respectively implement functions of the first network device and the second network device in the embodiment shown in FIG. 3A, FIG. 3B, FIG. 3C, FIG. 3D, or FIG. 4. For example, the first network device 1201 performs processes S301, S302, and S304 in FIG. 3A, processes S301, S3021, S3022, S3023, S303, and S304 in FIG. 3B, processes S3031, S3032, S3033, S3034, and S3035 in FIG. 3C, processes S301, S302, S303, S3034, S3035, S3036, and S304 in FIG. 3D, and/or another process performed by the first network device in the technology described in this specification. The second network device 1202 is configured to send a TCP packet to the first network device 1201, where the TCP packet includes a service identifier and receive a first TCP ACK packet sent by the first network device 1201, where the first TCP ACK packet includes a TCP window obtained by the first network device 1201.

In an example, the system 1200 further includes a third network device, where the third network device is configured to implement functions of the third network device in the embodiment shown in FIG. 3D. For example, the third network device receives the TCP packet sent by the first network device 1201, and sends an ACK packet corresponding to the TCP packet to the first network device 1201.

In an example, the system 1200 further includes a controller, where the controller is configured to implement the functions of the controller in the embodiments shown in FIG. 3B, FIG. 3C, and FIG. 4. For example, the controller receives a service identifier sent by the first network device 1201, obtains a service priority based on the service identifier, and calculates a TCP window, and sends the TCP window obtained through calculation to the first network device 1201.

An embodiment of the present disclosure further provides a storage medium configured to store a software instruction used in the foregoing embodiment, where the storage medium includes a program used to perform the method shown in the foregoing embodiment, and when the program is executed on a computer or a device, the computer or the device is enabled to perform the method in the foregoing method embodiment.

"First" in the first network device mentioned in the embodiments of the present disclosure is merely used to identify a name, and does not mean the first in sequence. For the words "second" and "third", this rule also applies.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the first network device or the controller provided in the embodiments of the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Methods or algorithm steps described in combination with the content disclosed in this embodiment of the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a hard disk, a removable hard disk, a compact disc, or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A method for sending a service packet, wherein the method is implemented by a first network device, and wherein the method comprises:
   receiving a Transmission Control Protocol (TCP) packet from a second network device, wherein the TCP packet comprises a service identifier;
   determining, based on the service identifier, a priority of a service corresponding to the service identifier;
   obtaining a TCP window based on the priority; and
   sending a first TCP acknowledgement (ACK) packet comprising the TCP window to the second network device to enable the second network device to calculate a size of the service packet to be sent to the first network device.

2. The method of claim 1, further comprising:
   sending the TCP packet to a third network device;
   receiving a second TCP ACK packet from the third network device;
   updating a second TCP window of the second TCP ACK packet with the TCP window; and
   generating the first TCP ACK packet.

3. The method of claim 1, further comprising:
   determining that the priority is a first priority;
   obtaining service requirement information of the service; and
   calculating the TCP window based on the service requirement information.

4. The method of claim 3, further comprising:
   sending the service identifier to a controller to store a correspondence between the service identifier and the service requirement information; and
   receiving the service requirement information from the controller.

5. The method of claim 3, further comprising:
   storing a correspondence between the service identifier and the service requirement information; and
   obtaining the service requirement information from the correspondence using the service identifier.

6. The method of claim 3, wherein the service requirement information comprises a throughput, wherein the throughput identifies traffic of a corresponding service to be transmitted by the first network device within a unit time, and wherein the method further comprises further calculating the TCP window based on the throughput and an occupied buffer size in a buffer of the first network device.

7. The method of claim 6, wherein the TCP window is calculated using the following formula:

$$\text{Throughput} * \frac{currentB}{C} \le \text{window} < \text{Throughput} * \frac{B}{C},$$

wherein Throughput is the throughput, wherein B is a size of the buffer, wherein currentB is the occupied buffer size, wherein window is the TCP window, and wherein C is:
  a rate of reading a queue from the buffer by the first network device when the first network device is a receive end of the service packet; and
  a transmission rate of an outbound interface used by the first network device to send the service packet when the first network device is an intermediate device on a service packet transmission path.

8. The method of claim 6, wherein the TCP window is calculated using the following formula:

$$\text{Throughput} * \left(\frac{currentB}{C} + \Delta t\right) \le \text{window} < \text{Throughput} * \left(\frac{B}{C} + \Delta t\right),$$

wherein Throughput is the throughput, wherein B is a size of the buffer, wherein currentB is the occupied buffer size, wherein window is the TCP window, wherein C is:
  a rate of reading a queue from the buffer when the first network device is a receive end of the service packet; and
  a transmission rate of an outbound interface used by the first network device to send the service packet when the first network device is an intermediate device on a service packet transmission path, and
  wherein Δt is:
    a processing delay of processing the service packet in the buffer when the first network device is the receive end of the service packet; and
    a transmission delay of the outbound interface used by the first network device to send the service packet when the first network device is the intermediate device on the service packet transmission path.

9. The method of claim 1, further comprising:
  determining that the priority is a first priority;
  sending the service identifier to a controller storing a correspondence between the service identifier and service requirement information of the service; and
  receiving the TCP window from the controller based on the service requirement information of the service.

10. A method for sending a service packet, wherein the method is implemented by a controller, wherein the method comprises:
  receiving a service identifier from a first network device;
  determining, based on the service identifier, a priority of a service corresponding to the service identifier;
  calculating a Transmission Control Protocol (TCP) window based on the priority; and
  sending the TCP window to the first network device to trigger the first network device to send the TCP window to a second network device to enable the second network device to calculate a size of the service packet to be sent to the first network device.

11. The method of claim 10, further comprising:
  determining that the priority is a first priority;
  obtaining, based on the service identifier, service requirement information corresponding to the service; and
  calculating the TCP window based on the service requirement information.

12. The method of claim 11, wherein the service requirement information comprises a throughput, wherein the throughput identifies traffic of a corresponding service to be transmitted by the first network device within a unit time, and wherein the method further comprises calculating the TCP window based on the throughput and an occupied buffer size in a buffer of the first network device.

13. The method of claim 12, further comprising calculating the TCP window using the following formula:

$$\text{Throughput} * \frac{currentB}{C} \le \text{window} < \text{Throughput} * \frac{B}{C},$$

wherein Throughput is the throughput, wherein B is a size of the buffer, wherein currentB is the occupied buffer size, wherein window is the TCP window, and wherein C is:
  a rate of reading a queue from the buffer by the first network device when the first network device is a receive end of the service packet; and
  a transmission rate of an outbound interface used by the first network device to send the service packet when the first network device is an intermediate device on a service packet transmission path.

14. The method of claim 12, further comprising calculating the TCP window using the following formula:

$$\text{Throughput} * \left(\frac{currentB}{C} + \Delta t\right) \le \text{window} < \text{Throughput} * \left(\frac{B}{C} + \Delta t\right),$$

wherein Throughput is the throughput, wherein B is a size of the buffer, wherein currentB is the occupied buffer size, wherein window is the TCP window that needs to be calculated, wherein C is:
  a rate of reading a queue from the buffer when the first network device is a receive end of the service packet; and
  a transmission rate of an outbound interface used by the first network device to send the service packet when the first network device is an intermediate device on a service packet transmission path, and
  wherein Δt is:
    a processing delay of processing the service packet in the buffer when the first network device is the receive end of the service packet; and
    a transmission delay of the outbound interface used by the first network device to send the service packet when the first network device is the intermediate device on the service packet transmission path.

15. A first network device comprising:
  a network interface configured to receive a Transmission Control Protocol (TCP) packet from a second network device, wherein the TCP packet comprises a service identifier; and
  a processor coupled to the network interface and configured to:
    determine, based on the service identifier, a priority of a service corresponding to the service identifier; and
    obtain a TCP window based on the priority,
  wherein the network interface is further configured to send a first TCP acknowledgement (ACK) packet comprising the TCP window to the second network device to enable the second network device to calculate a size of a service packet to be sent to the first network device.

16. The first network device of claim 15, wherein the network interface is further configured to:
send the TCP packet to a third network device; and
receive a second TCP ACK packet from the third network device, and
wherein the processor is further configured to:
update a second TCP window in the second TCP ACK packet with the TCP window; and
generate the first TCP ACK packet.

17. The first network device of claim 15, wherein the processor is further configured to:
determine that the priority is a first priority;
obtain service requirement information of the service; and
calculate the TCP window based on the service requirement information.

18. The first network device of claim 15, wherein the processor is further configured to determine that the priority is a first priority, and wherein the network interface is further configured to:
send the service identifier to a controller storing a correspondence between the service identifier and service requirement information of the service; and
receive the TCP window from the controller based on the service requirement information of the service.

19. The first network device of claim 15, wherein the processor is further configured to:
determine that the priority is a second priority;
determine an occupied buffer size in a buffer of the first network device; and
set the TCP window to zero when the priority is the second priority and the occupied buffer size is greater than or equal to a threshold.

20. A controller for sending a service packet comprising:
a network interface configured to receive a service identifier from a first network device; and
a processor coupled to the network interface and configured to:
determine, based on the service identifier, a priority of a service corresponding to the service identifier; and
calculate a Transmission Control Protocol (TCP) window based on the priority, and
wherein the network interface is further configured to send the TCP window to the first network device to trigger the first network device to send the TCP window to a second network device to enable the second network device to calculate a size of the service packet to be sent to the first network device.

21. The controller of claim 20, wherein the processor is further configured to:
determine that the priority is a first priority;
obtain, based on the service identifier, service requirement information corresponding to the service; and
calculate the TCP window based on the service requirement information.

* * * * *

UNITED STATES PATENT AND TRADEMARK OFFICE
CERTIFICATE OF CORRECTION

PATENT NO. : 11,258,717 B2  
APPLICATION NO. : 16/886218  
DATED : February 22, 2022  
INVENTOR(S) : Liu et al.

Page 1 of 1

It is certified that error appears in the above-identified patent and that said Letters Patent is hereby corrected as shown below:

On the Title Page

Page 2, item (56) References Cited, Foreign Patent Documents: "CN 1028935 a 1/2013" should read "CN 102893577 a 1/2013"

Signed and Sealed this
Twenty-sixth Day of April, 2022

Katherine Kelly Vidal
*Director of the United States Patent and Trademark Office*